United States Patent Office.

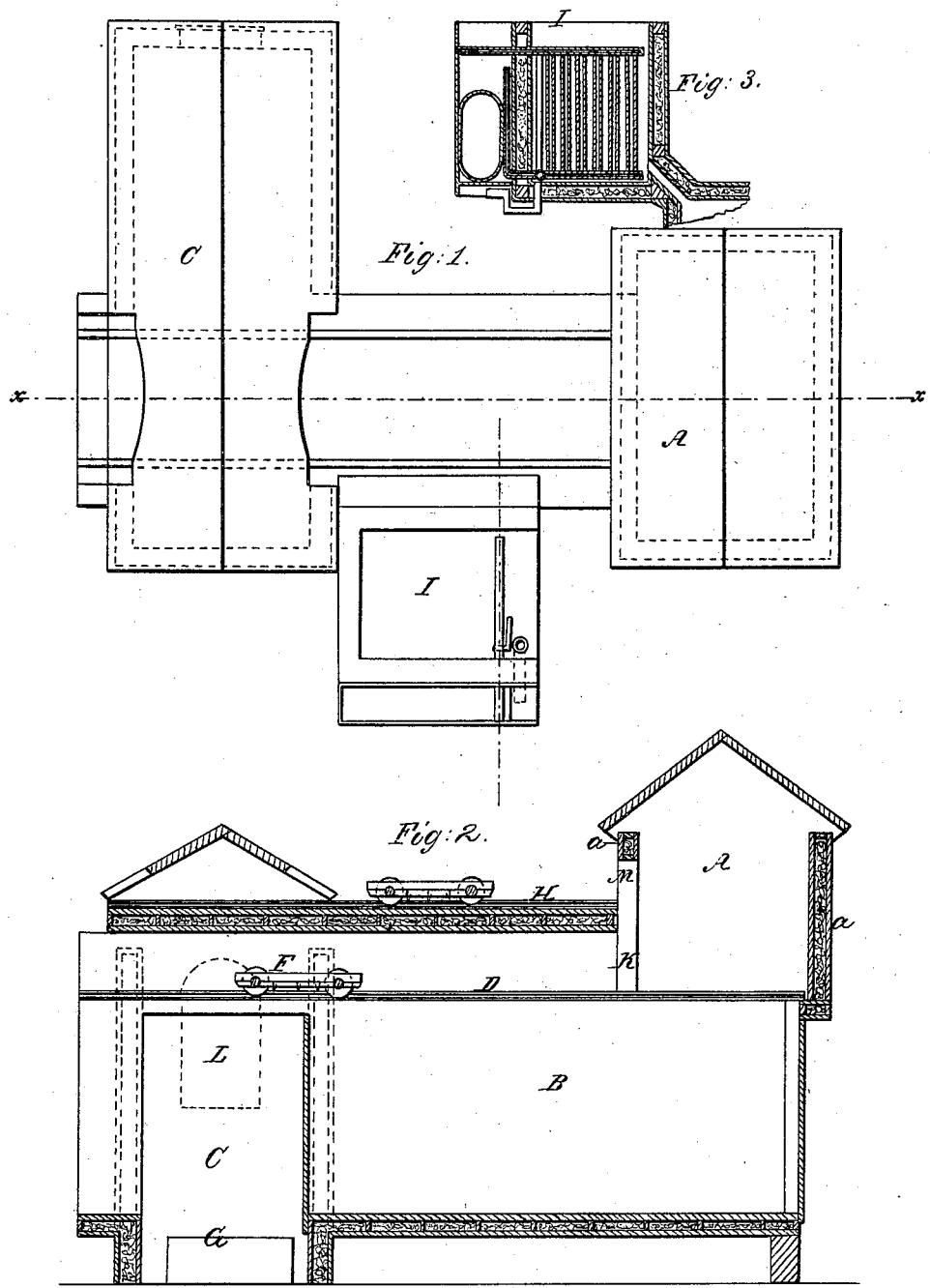

G. W. FULTON, OF FULTON, TEXAS.

Letters Patent No. 92,035, dated June 29, 1869.

---

IMPROVEMENT IN APPARATUS FOR SLAUGHTERING AND CURING MEAT.

---

The Schedule referred to in these Letters Patent and making part of the same.

---

*To all whom it may concern:*

Be it known that I, G. W. FULTON, of Fulton, in the county of Refugio, and State of Texas, have invented a new and improved Apparatus for Curing Meat; and I do hereby declare that the following is a full, clear, and exact description thereof, which will enable others skilled in the art to make and use the same, reference being had to the accompanying drawing, forming part of this specification.

This invention relates to improvements in slaughtering and packing-apparatus, having for its object to provide an economical arrangement of buildings and apparatus for handling and packing the meat; also, for preserving a low temperature for the better preservation and curing of the meat.

Figure 1 represents a plan view of my improved apparatus;

Figure 2 represents a sectional elevation, taken on the line x x of fig. 1; and

Figure 3 represents a sectional elevation of the cooling-apparatus, taken on the line y y.

Similar letters of reference indicate corresponding parts.

I propose to construct a slaughtering and packing-house, and a covered way between them, with double walls, having a space between to be packed with non-heat-conducting material, as shown at a, and near the covered way between them, I provide a cooling-apparatus for discharging air of low temperature into all the chambers of the whole buildings, so as to maintain as low a temperature of pure air throughout as possible, to which the live animals, carcasses, and the meat when chopped for packing, will be exposed, from the time of entering until packed and ready for delivery, which apparatus is designed more especially for warm climates, and intended, by the action of the pure air, to have a curing and preserving effect upon the meat.

A represents the slaughtering-house, which I propose to place in an elevated position, into which the animals may be driven up an incline to save the cost of elevating them, and from which it is easy to pass them down and at the several stages.

It is also desirable to have it elevated for the better action of the air, which is delivered from the cooling-channel B.

C represents the packing-house, to which the slaughtered animals are to be conveyed along a railroad, D, in the upper part of the cooling-channel, which is also the covered way leading from the said slaughter-house to the packing-house.

This railroad consists of a pair of rails suspended on the sides of the cooling-channel, without cross-ties between them, so that the carcasses may be suspended from hooks at the bottoms of the cars F.

As many cars are to be used as will stand along the track in a row, so that the carcasses will pass the cooling-space slowly and become as much cooled as possible.

When the cars arrive in the packing-house, the carcasses will be over a cutting-table, G, on to which they may be dropped, thereby saving unnecessary handling.

Above the covered way, I propose to arrange another track, H, for conveying the empty cars back to the slaughter-house.

The said cars may be mounted to and lowered from the said track in any preferred way.

At I, I have represented an air-cooling apparatus for cooling and delivering air to the space B.

This device may be an ordinary refrigerator containing ice, and suitably arranged to receive the external air, cool it, and deliver it to the cooling-space B, or it may be an ice-generating device.

The air may also be forced through it and through the building by steam-power.

The cooling-space may also be used for cooling the brine used to pack the meat in, by passing the said brine, previous to packing, through the said space in pipes.

It is specially important to arrange the cooling-device, so as to discharge the air, when in the coldest state, into the space B, near the entrance to the slaughter-house, whereby that part entering the slaughter-house, at K, which, in passing over the warm carcasses, becomes warmed to some extent, will be more nearly even with the external atmosphere, and the carcasses moving along with the cars, will be brought gradually into colder air as they become cooler.

This air escapes through the opening M.

The part passing the other way through the packing-house, will continue in a direct course, and escape through the passage L, thereby maintaining a steady flow of pure air, conveying away the emanation from the breath of the workmen, and all other foul air.

Having thus described my invention,

What I claim as new, and desire to secure by Letters Patent, is—

1. The arrangement of the slaughter-house A, cooling and carrying-way B, packing-house C, all substantially as specified.

2. The arrangement of the rails E, cars F, and cutting-table G, substantially as specified.

3. The combination of the cooling-apparatus I, cooling-chamber B, slaughter-house A, and packing-house C, when all arranged substantially as specified.

The above specification of my invention signed by me, this     day of April, 1869.

G. W. FULTON.

Witnesses:
A. T. WATERMAN,
W. F. JOHNSON.